UNITED STATES PATENT OFFICE.

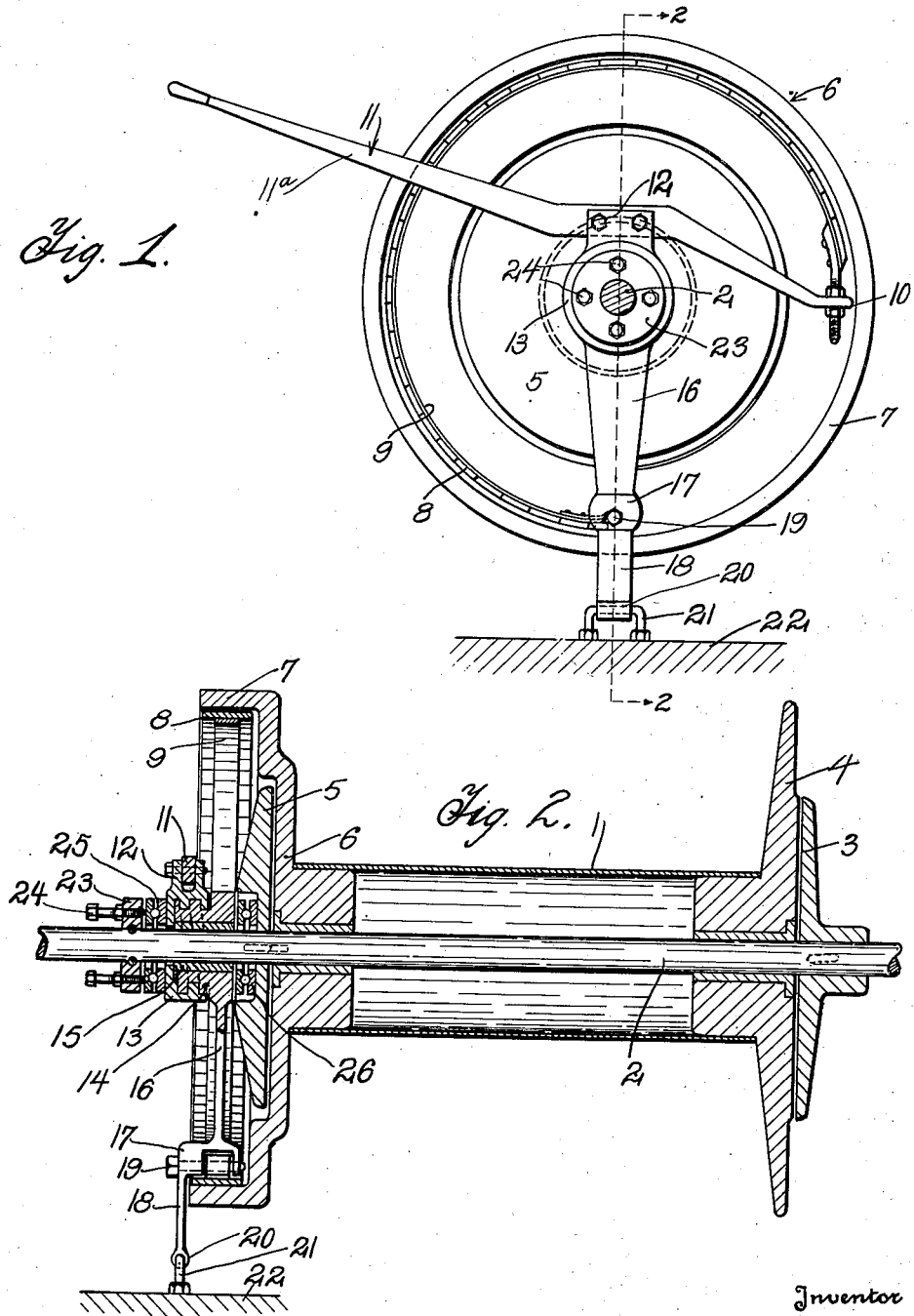

LINN D. EKIN, OF BUTLER, PENNSYLVANIA.

HOISTING-DRUM CONTROL.

1,417,465.  Specification of Letters Patent.  Patented May 23, 1922.

Application filed February 12, 1921. Serial No. 444,419.

*To all whom it may concern:*

Be it known that I, LINN D. EKIN, a citizen of the United States, residing at Butler, in the county of Butler and State of Pennsylvania, have invented new and useful Improvements in Hoisting - Drum Controls, of which the following is a specification.

This invention relates to hoisting drums, and more particularly to means for controlling rotation of a drum.

The primary object of the invention is to provide simple and efficient means whereby rotation of a hoisting drum may be quickly and easily controlled. A further object is to provide a control lever in conjunction with a driven shaft and a drum, and means for operatively connecting the drum to the shaft when the lever is rocked in one direction and for releasing the drum and braking the same when the shaft is rocked in the other direction. Further objects will appear from the detailed description.

In the drawings:

Figure 1 is an end view of a drum with a control means constructed in accordance with my invention applied.

Figure 2 is a longitudinal sectional view through the drum and the control means.

A drum 1 is rotatably mounted on an operating shaft 2 which may be rotated in any suitable manner. A disc 3 is keyed on shaft 2 adjacent to one head 4 of the drum. A disc 5 is feathered on shaft 2 adjacent to the other head 6 of the drum. Head 6 is provided with an outer annular flange 7 adapted for contact with a brake element 8 carried by a brake band 9 positioned within flange 7.

One end of brake band 9 is adjustably secured, at 10, to one end of an operating lever 11. This lever is secured in a bracket 12 which projects from a collar 13 threaded upon a sleeve 14 mounted upon a bushing 15 which is freely slidable upon shaft 2. Sleeve 14 is provided with an integral depending arm 16 at the lower end of which is formed a U element 17 from which depends a finger 18. The other end of brake band 9 is secured in element 17 by a screwed bolt 19, or in any other suitable manner. Finger 18 is provided at its lower end with a tubular element 20 through which is passed the bight portion of a U shaped anchor member 21 by means of which finger 18 is attached to a suitable base 22 for supporting the drum and associated parts, it being understood that shaft 2, in practice, is rotatably supported by suitable standards or in any other suitable manner.

A ring 23 is mounted on shaft 2 beyond collar 13, this ring being secured against movement longitudinally of the shaft. Set screws 24 are threaded through the ring and contact with the outer member of a thrust bearing 25 positioned between ring 23 and collar 13. A thrust bearing 26 is positioned between the inner end of sleeve 14 and disc 5. In operation, shaft 2 is rotated in a clockwise direction in any suitable or preferred manner, a cable being secured to drum 1 so as to be wound thereon during rotation of the drum in a clockwise direction, and unwound from the drum upon reverse rotation of the same. For winding the cable drum 1 is connected to shaft 2 so as to rotate therewith. This is accomplished by raising the longer arm $11^a$ of control lever 11 into substantially the position illustrated in Figure 1. This contracts brake band 9 so as to move brake element 8 out of contact with flange 7 thus releasing drum 1. This raising of the longer arm of the control lever also serves to rock collar 13 upon sleeve 14, the collar and the sleeve being provided with interengaging left hand threads as in Figure 2. This rocking of the collar about the sleeve in a clockwise direction serves to force the sleeve into contact with disc 5 thus forcing the disc into contact with head 6 of the drum. This pressure of disc 5 against head 6 of the drum causes very slight endwise movement of drum 1 upon shaft 2 so as to force head 4 of the drum into tight contact with disc 3. It is possible by means of the lever and screw connection provided to obtain great pressure upon the discs 3 and 5 and the heads of the drum by exerting comparatively slight upward pressure upon the longer arm of the control lever, this pressure being sufficient to force the discs into tight frictional contact with the heads of the drum so as to lock these discs and the drum heads together. As the discs are secured to shaft 2 for rotation therewith, by raising the longer arm of the control lever the drum is connected to the shaft so as to rotate therewith for winding purposes. When it is desired to permit rotation of drum 1 in a reverse or unwinding direction, the longer arm of the control lever is depressed. This results in releasing the drum from the shaft, after which the brake band is expanded so as to force brake element 8 into contact with flange 7 of drum head 6, the pressure with which the brake element is applied being readily regulated by the control lever, thus providing simple and efficient means for regulating the speed of rotation of the drum in unwinding direction.

It will be observed from the foregoing that I have provided very simple and efficient means for controlling a winding drum in which the operation of the drum is easily and accurately controlled by a single lever. As will be understood, it may be found desirable in practice to resort to slight changes in details of construction and arrangement of parts of the invention, and I intend to include all such variations, as fall within the scope of the appended claims, in this application in which the preferred form only of my invention is disclosed.

What I claim is:—

1. In drum control means, a rotatably mounted shaft, a drum loosely mounted on the shaft, a control lever, braking means, and means for securing the drum to the shaft for rotation therewith when the lever is rocked in one direction and for releasing the drum from the shaft when the lever is rocked in the other direction, said lever being extended and secured to said braking means for applying the latter to the drum when the lever is rocked in drum releasing direction and releasing the braking means when the lever is rocked in drum securing direction.

2. In drum control means, a rotatably mounted shaft, a drum loosely mounted on said shaft and provided with an element for contact with a brake member, a lever, means for securing the drum to the shaft when the lever is rocked in one direction and for releasing the drum when the lever is rocked in the other direction, and a brake member; said lever being extended and secured to the brake member for moving the same into and out of contact with the brake element of the drum in accordance with movement of the lever in drum releasing and drum securing directions.

3. In drum control means, a rotatably mounted shaft, a drum loose on said shaft and provided with a braking flange, a lever, means for securing the drum to the shaft when the lever is rocked in one direction and for releasing the drum when the lever is rocked in the other direction, and a brake band positioned to be moved into and out of contact with said flange, said band being fixed at one end and the lever being extended and secured to the other end of the band so as to apply the band to the flange when the lever is rocked in drum releasing direction and vice versa.

4. In drum control means, a rotatably mounted shaft, a drum loose on the shaft and provided at one end with a braking flange, a lever, means for securing the drum to the shaft when the lever is rocked in one direction and for releasing the drum when the lever is rocked in the other direction, a brake band positioned within said flange and secured at one end, and direct connections between the other end of the band and the lever for expanding and contracting said band in accordance with movement of the lever in drum releasing and drum securing direction.

5. In drum control means, a shaft, a drum mounted upon and free from said shaft, a disc secured to the shaft at one end of the drum, a disc feathered on the shaft at the other end of the drum, a sleeve slidably mounted on the shaft adjacent to the outer face of the second mentioned disc, a collar mounted upon said sleeve to turn about the same, the sleeve being held against turning movement about the shaft, means for preventing movement of the collar longitudinally of said shaft away from the drum, said collar and the sleeve being provided with co-operating means for forcing the collar toward the drum when the sleeve is turned in one direction and for moving the sleeve away from the drum when said collar is turned in the other direction, means for braking the drum to retard rotation thereof upon the shaft, and means for turning the collar upon said sleeve, said collar turning means being connected to the braking means so as to apply and release the same in accordance with movement of the sleeve away from and toward the drum.

6. In drum control means, a shaft, a drum mounted upon and free from said shaft, one head of the drum being provided with an outer peripheral flange, a disc secured to the shaft adjacent to the other head of the drum, a disc feathered on the shaft adjacent to the flanged head of the drum, a sleeve slidable upon the shaft and positioned adjacent to the outer face of the disc at the flanged head of the drum, a collar mounted upon said sleeve to turn upon the same, the sleeve being held against turning movement about the shaft, means for holding the collar against movement longitudinally of the shaft in a direction away from the drum, a brake band positioned within the flange of said flanged drum head, said band being secured at one end, and a control lever secured to said collar for turning the same upon the sleeve and connected to the brake band for contracting and expanding the same, the collar and the sleeve being provided with co-operating means for forcing the sleeve toward the drum when the collar is turned in one direction and forcing the sleeve away from the drum when said collar is turned in the other direction, the connections between the control lever and the brake band being such as to contract the band when the sleeve is forced toward the drum and expand said band when the sleeve is moved away from the drum.

7. In drum control means, a shaft, a drum mounted upon and free from said shaft, a disc secured on the shaft at one end of the drum, a disc feathered on the shaft at the other end of the drum, the head of the drum adjacent to the second mentioned disc being provided with an outer peripheral flange, a sleeve slidably mounted on the shaft adjacent to said second mentioned disc, a collar mounted upon said sleeve to turn about the same, means for holding the collar against movement longitudinally of the shaft in a direction away from the drum, a lever secured intermediate its ends to the collar, a brake band positioned inside of the flange of said flanged drum head, means for securing one end of said band and for holding said sleeve against turning about the shaft, the sleeve and said collar being provided with co-operating means for forcing the sleeve toward the drum when the collar is turned in one direction and away from the drum when the collar is turned in the other direction, and connections between said lever and the other end of the brake band for expanding said band when the sleeve is moved away from the drum and contracting said brake band when said sleeve is forced toward the drum.

In testimony whereof I affix my signature.

LINN D. EKIN.